US006917703B1

(12) United States Patent
Steffens et al.

(10) Patent No.: US 6,917,703 B1
(45) Date of Patent: Jul. 12, 2005

(54) METHOD AND APPARATUS FOR IMAGE ANALYSIS OF A GABOR-WAVELET TRANSFORMED IMAGE USING A NEURAL NETWORK

(75) Inventors: Johannes B. Steffens, Redondo Beach, CA (US); Hartwig Adam, Santa Monica, CA (US); Hartmut Neven, Santa Monica, CA (US)

(73) Assignee: Nevengineering, Inc., Santa Monica, CA (US)

( * ) Notice: Subject to any disclaimer, the term of this patent is extended or adjusted under 35 U.S.C. 154(b) by 648 days.

(21) Appl. No.: 09/795,665

(22) Filed: Feb. 28, 2001

(51) Int. Cl.[7] .................................................. G06K 9/62
(52) U.S. Cl. ........................ 382/156; 382/118; 382/224; 382/276
(58) Field of Search .................................. 382/118, 224, 382/276, 103, 156, 228, 207, 215, 216, 219, 278, 190, 180, 181, 253; 348/161, 169; 345/473, 419, 422, 421; 399/52, 901

(56) References Cited

U.S. PATENT DOCUMENTS

| | | | |
|---|---|---|---|
| 4,725,824 A | 2/1988 | Yoshioka | |
| 4,805,224 A | 2/1989 | Koezuka et al. | |
| 4,827,413 A | 5/1989 | Baldwin et al. | |
| 5,159,647 A | 10/1992 | Burt | |
| 5,168,529 A | 12/1992 | Peregrim et al. | |
| 5,187,574 A | 2/1993 | Kosemura et al. | |

(Continued)

FOREIGN PATENT DOCUMENTS

| | | |
|---|---|---|
| DE | 4406020 C1 | 6/1995 |
| EP | 0807902 A2 | 11/1997 |
| WO | WO99/53443 | 10/1999 |

OTHER PUBLICATIONS

A. Jonathan Howell et al. "Towards unconstrained face recognition from image sequences", IEEE Publication Date Oct. 14–16, 1996, pp. 224–229.*

Notification of Transmittal of the International Report or the Declaration, International Search Report for PCT/US02/23973, mailed Nov. 18, 2002.

Valente, Stephanie et al., "A Visual Analysis/Synthesis Feedback Loop for Accurate Face Tracking", Signal Processing Image Comunication, Elsevier Science Publishers, vol. 16, No. 6, Feb. 2001, pp. 585–608.

Yang, Tzong Jer, "Face Analysis and Synthesis", Jun. 1, 1999, Retrieved from Internet, http://www.cmlab.csie.ntu.edu.tw/ on Oct. 25, 2002, 2 pg.

Yang, Tzong Jer, "VR–Face: An Operator Assisted Real–Tine Face Tracking System", Communication and Multimedia Laboratory, Dept. of Computer Science and Information Engineering, National Taiwan University, Jun. 1999, pp. 1–6.

(Continued)

*Primary Examiner*—Bhavesh M. Mehta
*Assistant Examiner*—Sheela C. Chawan
(74) *Attorney, Agent, or Firm*—Robroy R. Fawcett (57) ABSTRACT

The present invention may be embodied in a method, and in a related apparatus, for classifying a feature in an image frame. In the method, an original image frame having an array of pixels is transformed using Gabor-wavelet transformations to generate a transformed image frame. Each pixel of the transformed image is associated with a respective pixel of the original image frame and is represented by a predetermined number of wavelet component values. A pixel of the transformed image frame associated with the feature is selected for analysis. A neural network is provided that has an output and a predetermined number of inputs. Each input of the neural network is associated with a respective wavelet component value of the selected pixel. The neural network classifies the local feature based on the wavelet component values, and indicates a class of the feature at an output of the neural network.

24 Claims, 6 Drawing Sheets

U.S. PATENT DOCUMENTS

| | | | |
|---|---|---|---|
| 5,220,441 A | 6/1993 | Gerstenberger | |
| 5,280,530 A | 1/1994 | Trew et al. | |
| 5,333,165 A | 7/1994 | Sun | |
| 5,383,013 A | 1/1995 | Cox | |
| 5,430,809 A | 7/1995 | Tomitaka | |
| 5,432,712 A | 7/1995 | Chan | |
| 5,465,308 A * | 11/1995 | Hutcheson et al. | 382/159 |
| 5,511,153 A | 4/1996 | Azarbayejani et al. | |
| 5,533,177 A | 7/1996 | Wirtz et al. | |
| 5,550,928 A | 8/1996 | Lu et al. | |
| 5,581,625 A | 12/1996 | Connell | |
| 5,588,033 A | 12/1996 | Yeung | |
| 5,680,487 A | 10/1997 | Markandey | |
| 5,699,449 A * | 12/1997 | Javidi | 382/156 |
| 5,703,964 A * | 12/1997 | Menon et al. | 382/228 |
| 5,714,997 A | 2/1998 | Anderson | |
| 5,715,325 A | 2/1998 | Bang et al. | |
| 5,719,954 A | 2/1998 | Onda | |
| 5,736,982 A | 4/1998 | Suzuki et al. | |
| 5,764,803 A | 6/1998 | Jacquin et al. | |
| 5,774,591 A | 6/1998 | Black et al. | |
| 5,802,220 A | 9/1998 | Black et al. | |
| 5,809,171 A | 9/1998 | Neff et al. | |
| 5,828,769 A | 10/1998 | Burns | |
| 5,842,194 A * | 11/1998 | Arbuckle | 706/52 |
| 5,917,937 A | 6/1999 | Szeliski et al. | |
| 5,982,853 A | 11/1999 | Liebermann | |
| 5,995,119 A | 11/1999 | Cosatto et al. | |
| 6,011,562 A | 1/2000 | Gagne | |
| 6,044,168 A | 3/2000 | Tuceryan et al. | |
| 6,052,123 A | 4/2000 | Lection et al. | |
| 6,301,370 B1 * | 10/2001 | Steffens et al. | 382/103 |

OTHER PUBLICATIONS

International Search Report for PCT/US99/07935.

Akimoto, T., et al., "Automatic Creation of Facial 3D Models", IEEE Computer Graphics & Apps., pp. 16–22, Sep. 1993.

Ayache, N. et al., "Rectification of Images for Binocular and Trinocular Stereovision", Pro. Of 9th Int'l., Conference on Pattern Recognition, 1, pp. 11–16, Italy, 1988.

Belhumeur, P., "A Bayesian Appraoch to Binocular Stereopsis", *Int'l. J. Of Computer Vision*, 19 (3), pp. 237–260, 1996.

Beymer, D.J., "Face Recognition Under Varying Pose", MIT A.I. Lab, Memo No. 1461, pp. 1–13, Dec. 1993.

Beymer, D.J., "Face Recognition Under Varying Pose", MIT A.I. Lab. Research Report, 1994, pp. 756–761.

Buhmann, J. et al., "Distortion Invariant Object Recognition By Matching Hierarchically Labeled Graphs", In Proceedings IJCNN Int'l Conf. Of Neural Networks, Washington, D.C. Jun. 1989, pp. 155–159.

DeCarlo, D., et al., "The Integration of Optical Flow and Deformable Models with Applications to Human Face Shape and Motion Estimation", pp. 1–15, In Proc. CVPR '96, pp. 231–238 (published)[TM 18.9.96].

Devemay, F. et al., "Computing Differential Properties of 3–D Shapes from Steroscopic Images without {3–D} Models", INRIA, RR–2304, pp. 1–28, Sophia, Antipolis, 1994.

Dhond, U., "Structure from Stereo: a Review", IEEE Transactions on Systems, Man, and Cybernetics, 19(6), pp. 1489–1510, 1989.

Fleet, D.J., et al., "Computation of Component Image Velocity from Local Phase Information", *Int., J. Of Computer Vision*, 5:1, pp. 77–104 (1990).

Fleet, D.J., et al. *Measurement of Image Velocity*, Kluwer Academic Press, Boston, pp. 1–203, 1992.

Hall, E.L., "Computer Image Processing And Recognition", Academic Press 1979, 99, 468–484.

Hong, H.,et al., "Online Facial Recognition based on Personalized Gallery", Proceedings of Int'l Conference On Automatic Face And Gesture Recognition, pp. 1–6, Japan Apr. 1997.

Kolocsai, P., et al, Statistical Analysis of Gabor–Filter Representation, *Proceedings of International Conference on Automatic Face and Gesture Recognition, 1997*, 4 pp.

Kruger, N., "Visual Learngng with a priori Constraints", *Shaker Verlag*, Aachen, Germany, 1998, pp. 1–131.

Kruger, N., et al, "Principles of Cortical Processing Applied to and Motivated by Artificial Object Recognition", Institut fur Neuroinformatik, *Internal Report 97–17*, Oct. 97, pp. 1–12.

Kruger, N., et al, "Autonomous Learning of Object Representations Utilizing Self–Controlled Movements", 1998, *Proceedings of NN98*, 5 pp.

Kruger, N., et al, "Object Recognition with a Sparse and Autonomously Learned Representation Based on Banana Wavelets", *Internal Report 96–11*, Institut fur Neuroinformatik, Dec. 96, pp. 1–24.

Kruger, N., et al, "Object Recognition with Banana Wavelets", *European Symposium on Artificial Neural Networks* (ESANN97), 1997, 6 pp.

Kruger, N., "An Algorithm for the Learning of Weights in Discrimination Functions Using *a priori* Constrsints", *IEEE Transactions on Pattern Analysis and Machine Intelligence*, vol. 19, No. 7, Jul. 1997, pp. 764–768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "Fundamental Matrix, Theory, Algorithm, and Stability Analysis", *INRIA*, 1993, pp. 1–46.

Manjunath, B. S., et al, "A Feature Based Approach to Face Recognition", *In Proceedings IEEE Conference on Computer Vision and Pattern Recognition*, pp. 373–378, Mar. 1992.

Mauer, T., et al, "Single–View Based Recognition of Faces Rotated in Depth", In *Proceedings of the International Workshop on Automatic Face and Gesture Recognition*, pp. 248–253, Zurich, CH, Jun. 26, 1995.

Mauer, T., et al, "Learning Feature Transformations to Recognize Faces Rotated in Depth", In *Proceedings of the International Conference on Artificial Neural Networks*, vol. 1, pp. 353–358, Paris, France, Oct. 9–13, 1995.

Mauer, T., et al, "Tracking and Learning Graphs and Pose on Image Sequences of Faces", *Proceedings of 2nd International Conference on Automatic Face and Gesture Recognition*, Oct. 14–16, 1996, pp. 176–181.

Maybank, S. J., et al, "A Theory of Self–Calibration of a Moving Camera", *International Journal of Computer Vision*, 8(2), pp. 123–151, 1992.

McKenna, S.J., et al, Tracking Facial Feature Points With Gabor Wavelets and Shape Models, (*publication & date unknown*), 6 pp.

Okada, K., et al, "The Bochum/USC Face Recognition System", 19 pp. (*publication & date unknown*).

Okutomi, M., et al, "A Multiple–Baseline Stereo", *IEEE Trans on Pattern Analysis and Machine Intelligence*, vol. 15, No. 4, pp. 353–363, Apr. 1993.

Peters, G., et al, "Learning Object Representations by Clustering Banana Responses", *Tech. Report IR–INI 96–09*, Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy*, CTAC International Technology Symposium, Aug. 18–22, 1997, 10 pages.

Pighin, F. et al., "Synthesizing Realistic Facial Expressions from Photographs", In *SIGGRAPH 98 Conference Proceedings*, pp. 75–84, Jul. 1998.

Roy, S., et al, "A Maximum Flow Formulation of the N–Camera Stereo Correspondence Problem", *IEEE, Proceedings of International Conference on Computer Vision*, Bombay, India, Jan. 1998, pp. 1–6.

Sara, R. et al "3–D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish–Scales: Representing Fuzzy Manifolds", *Proceedings International Conference Computer Vision, ICCV '98*, pp. 811–817, Bombay, Jan. 1998.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan—Apr. 1998.

Theimer, W.M., et al, "Phase–Based Binocular Vergence Control and Depth Reconstruction using Active Vision", *CVGIP: Image Understanding*, vol. 60, No. 3, Nov. 1994, pp. 343–358.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition*, Killington, VT, Oct. 1996, 6 pp.

Turk, M., et al, "Eigenfaces for Recognition", *Journal of Cognitive Neuroscience*, vol. 3, No. 1, pp. 71–86, 1991.

Wiskott, L., et al, "Face Recognition and Gender Determination", *Proceedings of International Workshop on Automatic Face and Gesture Recognition*, pp. 92–97, Zurich CH, Jun. 26, 1995.

Wiskott, L., et al, "Face Recognition by Elastic Bunch Graph Matching", *Internal Report, IR–INI 96–08*, Institut fur Neuroinformatik, Ruhr–Universitat, Bochum, pp. 1–21, Apr. 1996.

Wiskott, L., "Labeled Graphs and Dynamic Link Matching for Face Recognition and Scene Analysis", *Verlag Harr Deutsch*, Thun–Frankfurt am Main. Reihe Physik, Dec. 1995, pp. 1–109.

Wiskott, L., "Phanton Faces for Face Analysis", *Proceedings of 3rd Joint Symposium on Neural Computation*, Pasadena, CA, vol. 6, pp. 46–52, Jun. 1996.

Wiskott, L., "Phanton Faces for Face Analysis", *Internal Report, IR–INI 96–06*, Institut fur Neoroinformatik, Ruhr–Universitat, Bochum, Germany, Apr. 1996, 12 pp.

Wiskott, L. "Phantom Faces for Face Analysis", *Pattern Recognition*, vol. 30, No. 6, pp. 837–846, 1997.

Wiskott, L., et al, "Face Recognition by Elastic Bunch Graph Matching", *IEEE Transactions on Pattern Analysis and Machine Intelligence*, 19(7), pp. 775–779, 1997.

Wong, R., et al, "PC–Based Human Face Recognition System", *IEEE*, pp. 641–644, 1992.

Wurtz, R., "Object Recognition Robust Under Translations, Deformations, and Charges in Background", *IEEE Transactions on Patern Analysis and Machine Intelligence*, vol. 19, No. 7, Jul. 1997, pp. 769–775.

Wurtz, R., et al, "Corner Detection in Color Images by Multiscale Combination of End–stopped Cortical Cells", *Artificial Neural Networks—ICANN '97*, Lecture Notes in Computer Science, vol. 1327, pp. 901–906, Springer–Verlag, 1997.

Yao, Y., et al, "Tracking a Dynamic Set of Feature Points", *IEEE Transactions on Image Processing*, vol. 4, No. 10, Oct., 1995, pp. 1382–1394.

Development Services and Licensing Agreement, Jan. 1, 1998 (Redacted).

Exhibit I–2 of Development Services and Licensing Agreement, Jul. 26, 1999 (Redacted).

* cited by examiner

METHOD AND APPARATUS FOR IMAGE ANALYSIS OF A GABOR-WAVELET TRANSFORMED IMAGE USING A NEURAL NETWORK

BACKGROUND OF THE INVENTION

The present invention relates to image analysis, and more particularly, to feature classification and object analysis in an image frame.

Robust image analysis is able to classify objects or features in an image frame under a variety of lighting conditions, backgrounds, orientations, etc. However, existing image analysis techniques may not be sufficiently robust to achieve desired results.

Accordingly, there exists a significant need for improved and robust image analysis. The present invention satisfies this need.

SUMMARY OF THE INVENTION

The present invention may be embodied in a method, and in a related apparatus, for classifying a feature in an image frame. In the method, an original image frame having an array of pixels is transformed using wavelet transformations to generate a transformed image frame having an array of pixels. Each pixel of the transformed image is associated with a respective pixel of the original image frame and is represented by a predetermined number of wavelet component values. A pixel of the transformed image frame associated with the feature is selected for analysis. A neural network is provided that has an output and a predetermined number of inputs. The neural network is trained to classify the feature in a transformed image frame. Each input is associated with a respective wavelet component value of the predetermined number of wavelet component values of the selected pixel. The neural network classifies the local feature based on the wavelet component values provided at the neural network inputs, and indicates a class of the feature at the neural network output.

In more detailed features of the present invention, the wavelet transformations may use Gabor wavelets and each wavelet component value may be generated based on a Gabor wavelet having a particular orientation and frequency. The predetermined number of wavelet component values and the predetermined number of neural network inputs may be 12. Also, the wavelet component values may be magnitudes of complex numbers.

Alternatively, the present invention may be embodied in a method, and in a related apparatus, for analyzing an object image in an image frame. In the method, an original image frame having an array of pixels is transformed using wavelet transformations to generate a transformed image frame having an array of pixels. Each pixel of the transformed image is associated with a respective pixel of the original image frame and is represented by a predetermined number of wavelet component values. Pixels of the transformed image frame are selected that correspond to sensing nodes of a label graph. Each sensing node is for analyzing a local feature of the object image in the original image frame. A plurality of neural networks is provided, each neural network having an output and a predetermined number of inputs. Further, each neural network is trained to analyze the respective local feature of the object image in a transformed image frame and is associated with a sensing node of the label graph. Each input is associated with a respective wavelet component value of the predetermined number of wavelet component values of the respective selected pixel. Using the neural networks, the local features are analyzed based on the wavelet component values provided at the neural network inputs, and a characteristic of the object image is indicated based on the neural network outputs Other features and advantages of the present invention should be apparent from the following description of the preferred embodiments taken in conjunction with the accompanying drawings, which illustrate, by way of example, the principles of the invention.

DETAILED DESCRIPTION OF THE PREFERRED EMBODIMENTS

Figure 1:
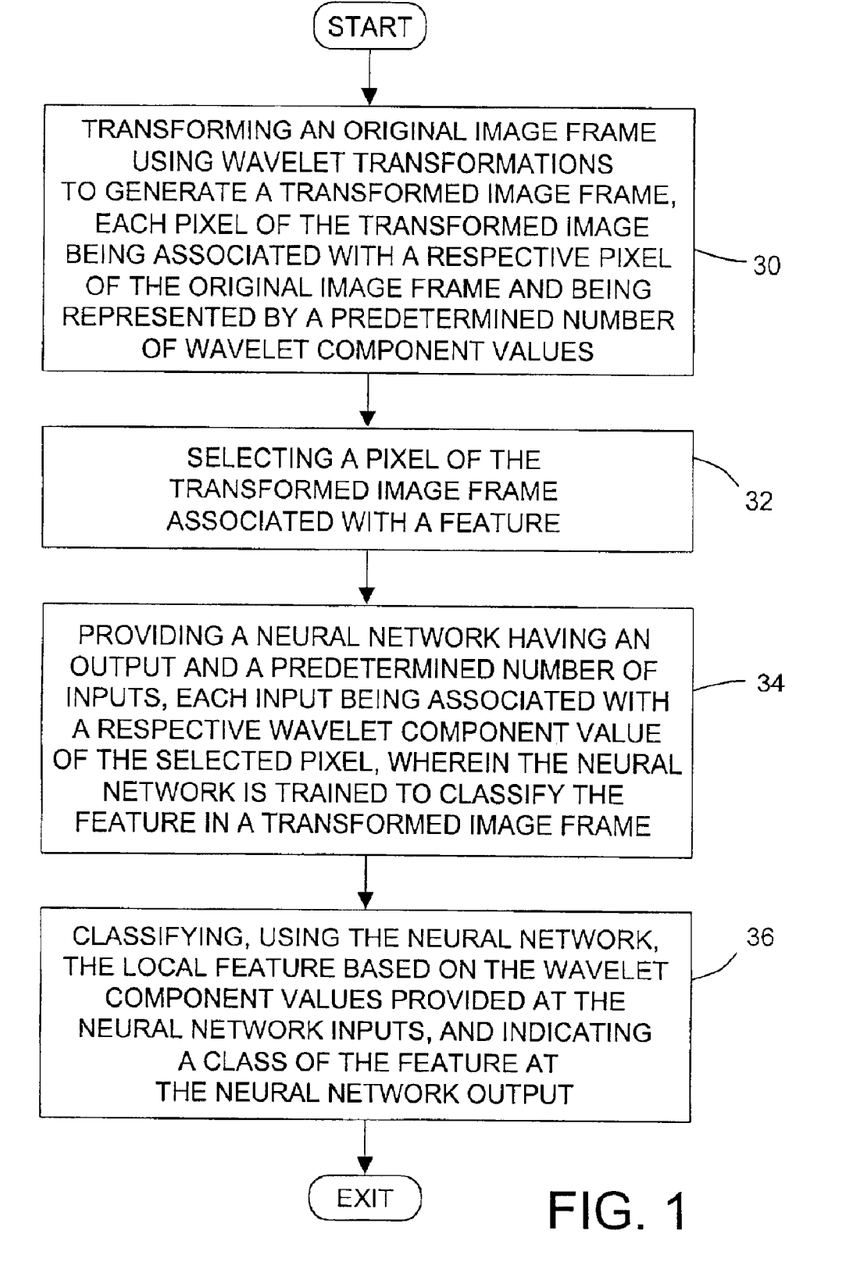
FIG. 1 is a flow diagram of a method for image analysis of a Gabor-wavelet transformed image using a neural network, according with the invention.
Figure 2:
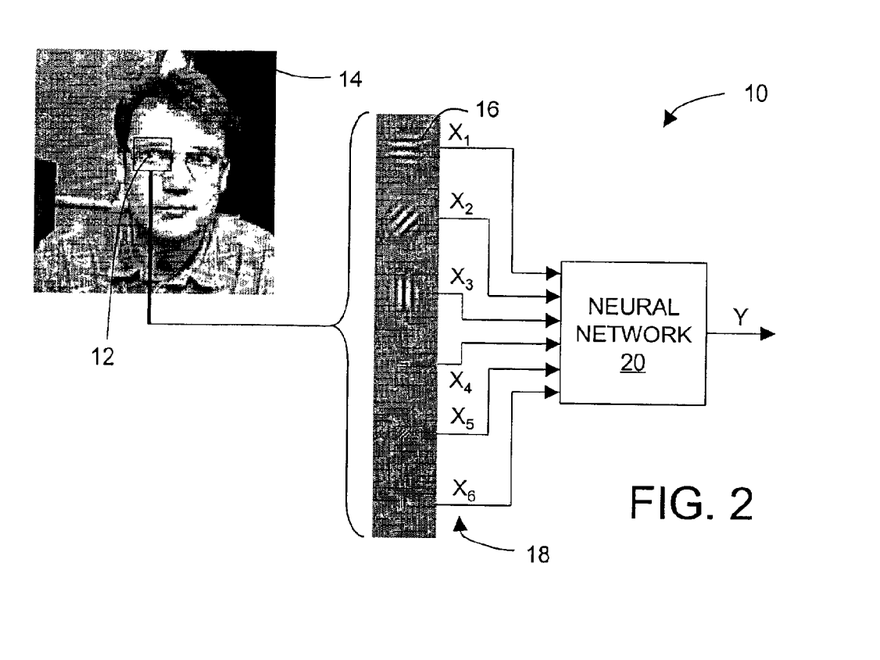
FIG. 2 is a block diagram of an apparatus for image analysis of a Gabor-wavelet transformed image using a neural network, according with the invention.

With reference to FIGS. 1 and 2, the present invention may be embodied in a method (FIG. 1), and in a related apparatus 10 (FIG. 2), for classifying a feature 12 in an image frame 14. In the method, an original image frame 14 having an array of pixels is transformed using wavelet 16 transformations to generate a transformed image frame having an array of pixels (step 30). Each pixel of the transformed image is associated with a respective pixel of the original image frame and is represented by a predetermined number of wavelet component values 18. A pixel of the transformed image frame that is associated with the feature is selected for analysis (step 32). A neural network 20 is provided that has an output Y and a predetermined number of inputs (step 34). The neural network is trained to classify the feature in a transformed image frame. Each input is associated with a respective wavelet component value of the predetermined number of wavelet component values of the selected pixel. The neural network classifies the local feature based on the wavelet component values provided at the neural network inputs, and indicates a class of the feature at the neural network output (step 36).

The wavelet transformations may use Gabor wavelets 16 and each wavelet component value 18 may be generated based on a Gabor wavelet having a particular orientation and spatial frequency. The predetermined number of wavelet component values and the predetermined number of neural network inputs may be 12. Also, the wavelet component values may be magnitudes of complex numbers.

Figure 3:
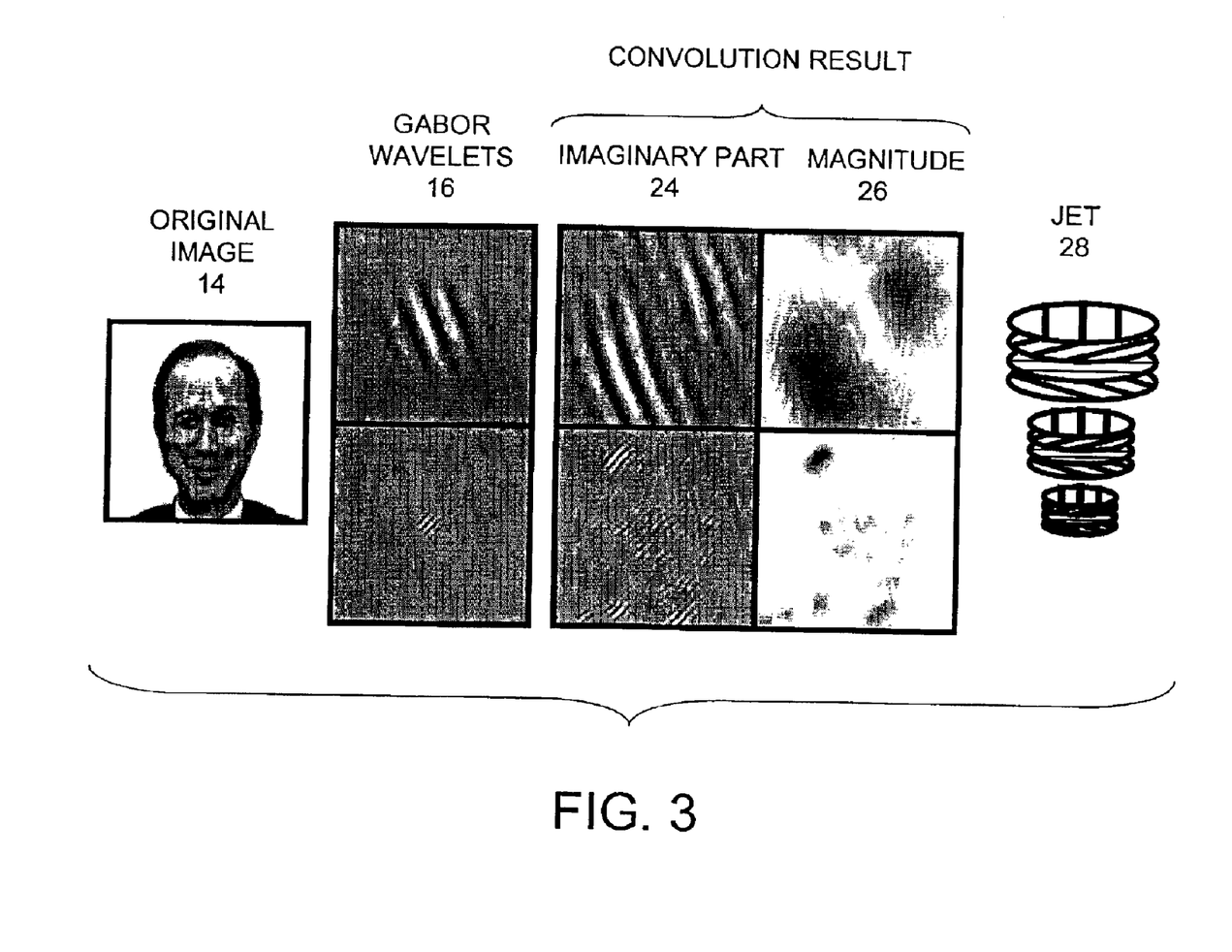
FIG. 3 is a series of images showing processing of a facial image using Gabor wavelets.

The Gabor-wavelet transformation may be described in more detail with reference to FIG. 3. The orginal image 14 is processed using Gabor wavelet transformations to generate respective convolution results. Wavelets are functions that resolve data into different frequency components, and then analyze each component with a resolution matched to its scale. Empirical results have indicated that Gabor wavelets 16 are particularly advantageous for analysis of facial images. However, other wavelet functions may provide advantages similar to Gabor wavelets in object and feature analysis. The wavelet transformations result from a convolution with a family of complex Gabor wavelets or kernels. A Gabor kernel consists of a two-dimensional complex wave field modulated by a Gaussian envelope. All of the Gabor kernels in the wavelet family are similar in the sense that they can be generated from a basic kernel simply by dilation and rotation For each location (i.e., pixel row and column) in the original image, a complex value associated with each Gabor kernel is generated. The complex value has an imaginary part 24 and a magnitude 26. The equations and features related to the Gabor wavelet transformations are disclosed in U.S. Pat. No. 6,222,939, titled LABELED BUNCH GRAPHS FOR IMAGE ANALYSIS, which patent is incorporated herein by reference. The wavelet family may have a discrete hierarchy of 3 spatial resolutions and 4 orietations at each resolution level, thus generating 12 complex values, referred to as a jet 28, for each pixel of the original image. Each jet describes the local features of the region surrounding the respective pixel. Jets of other hierarchies, i.e., spatial resolutions and orientations, may be used depending on the application, available processing power, etc. The images in FIG. 3 show the imaginary part 24 and magnitude 26 of two convolution results for two exemplary Gabor wavelets 16. For convenience, the other 10 convolution results are not shown.

Figure 4:
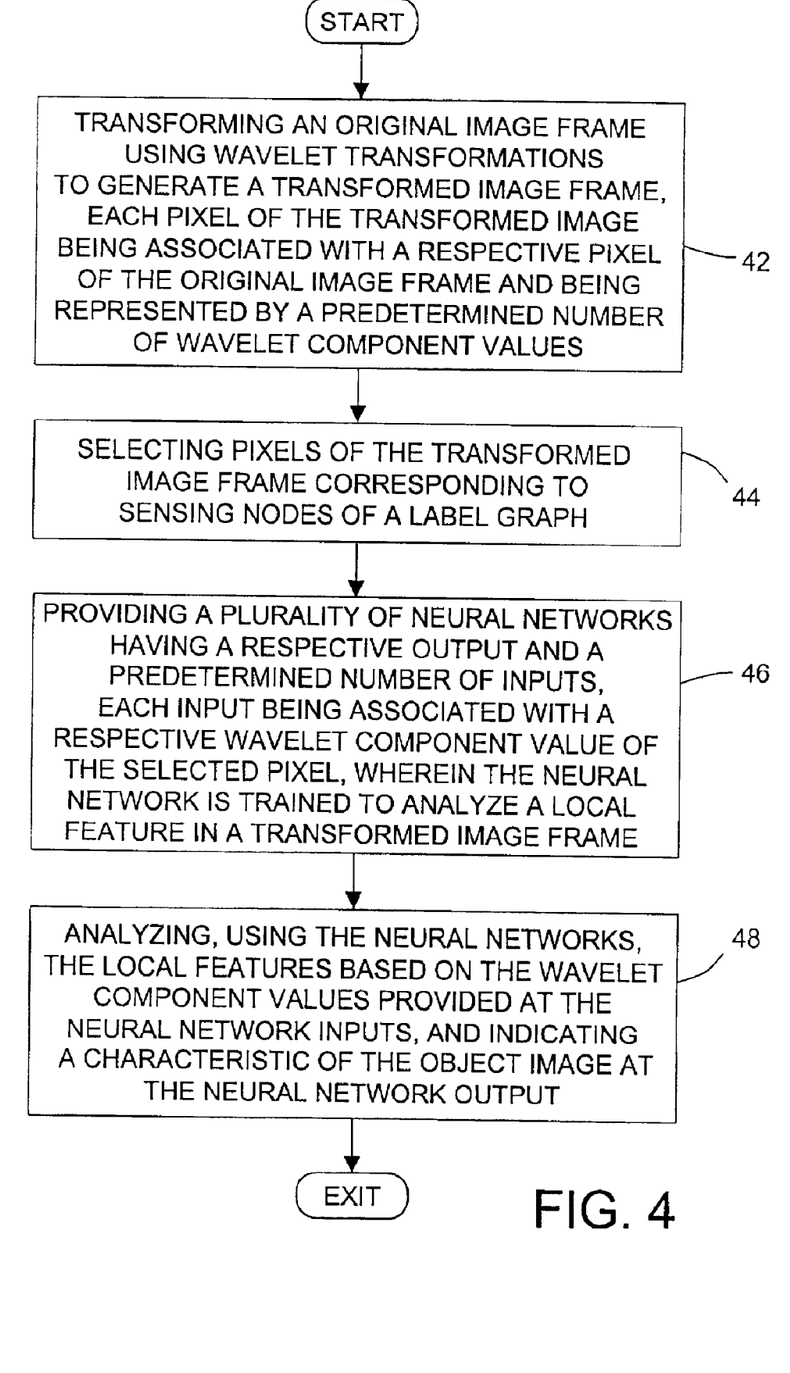
FIG. 4 is a flow diagram of another method for image analysis of a Gabor-wavelet transformed image using neural networks, according with the invention.
Figure 5:
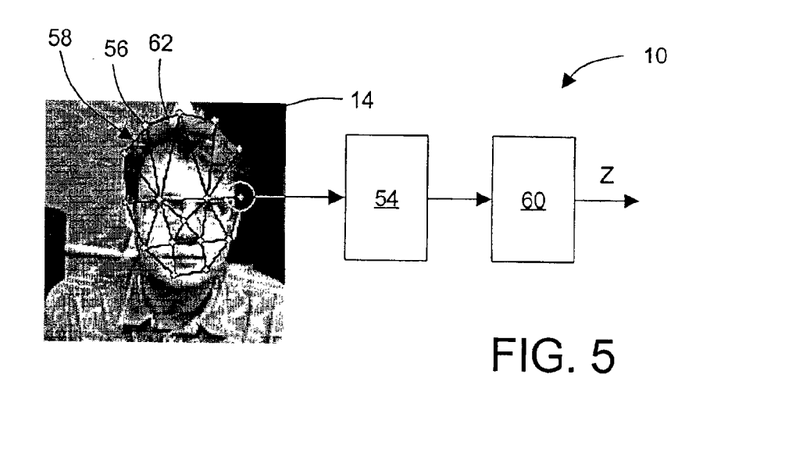
FIG. 5 is a block diagram of another apparatus for image analysis of a Gabor-wavelet transformed image using neural networks, according with the invention.

With reference to FIGS. 4 and 5, the present invention may be alternatively embodied in a method (FIG. 4), and in a related apparatus (FIG. 5), for analyzing an object image in an image frame 14. In the method, an original image frame 14 having an array of pixels is transformed using wavelet transformations to generate a transformed image frame 54 having an array of pixels (step 42). Each pixel of the transformed image is associated with a respective pixel of the original image frame and is represented by a predetermined number of wavelet component values. Pixels of the transformed image frame are selected that correspond to sensing nodes 56 of a label graph 58 (step 44). Each sensing node is for analyzing a local feature of the object image in the original image frame. A plurality 60 of neural networks 20 is provided, each neural network having an output and a predetermined number of inputs (step 46). Further, each neural network is trained to analyze the respective local feature 12 of the object image in a transformed image frame and is associated with a sensing node of the label graph. Each input is associated with a respective wavelet component value of the predetermined number of wavelet component values of the respective selected pixel. Using the neural networks, the local features are analyzed based on the wavelet component values provided at the neural network inputs, and a characteristic Z of the object image is indicated based on the neural network outputs (step 48)

The labeled image graph 58, as shown in FIG. 5, is advantageous in the analysis of the object image (in this context, a face). The nodes 56 of the labeled graph refer to points on the object image. Edges 62 of the graph are labeled with distance vectors between the nodes. The nodes and edges define the graph topology. Graphs with equal topology can be compared to determine the person's facial features and characteristics.

Figure 6:
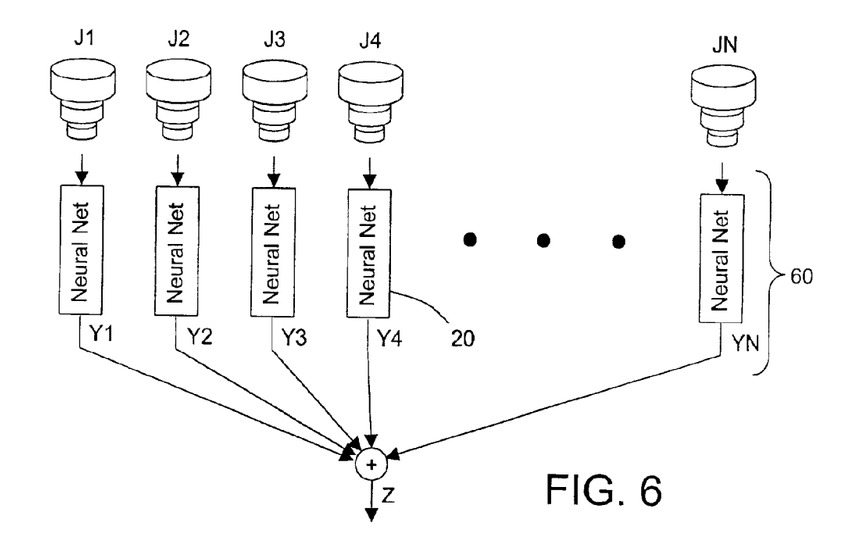
FIG. 6 is a schematic diagram of a plurality of neural networks for image analysis of a Gabor-wavelet transformed image.

The plurality 60 of neural networks 20 is shown in more detail in FIG. 6. The label graph 58 may have N nodes 56 which correspond to jets J1 through JN. The wavelet component values 18 for the jets 28 are input in a respective neural network. Each neural network has a respective output, Y1 through YN. The outputs are analyzed to characterize the object image. For example, the neural network outputs may be summed (and normalized) to generate an indicator value Z which may be compared with a threshold value. Alternatively, selected neural network outputs may be weighted to increase or decrease the output's contribution to the indicator value. As an example, the nodes associated with the eyes or the center of the face may have more effectiveness in analyzing a facial image than the nodes associated with the ears or the hair outline.

Figure 7:
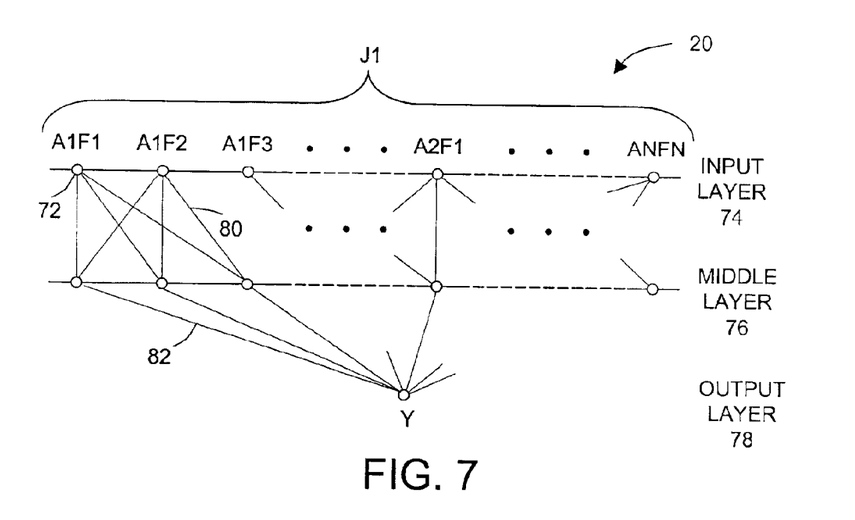
FIG. 7 is a schematic diagram of a neural network for classification of a local feature in an image frame.

A representative neural network 20 is shown in FIG. 7. The neural network may have nodes 72 that are arranged in three layers: an input layer 74, a middle (or hidden) layer 76, and an output layer 78. Each node on the input layer corresponds to an input of the neural network and is associated with one of the wavelet component values 18. For example, a jet J1 includes a plurality of wavelet component values A1F1 through ANFN, each value associated with a particular angle AN (or orientation) and spatial frequency FN (or resolution). The input layer nodes have weighted connections 80 with the middle layer nodes. Likewise, the middle layer nodes have weighted connections 82 with the output layer.

Figure 8:
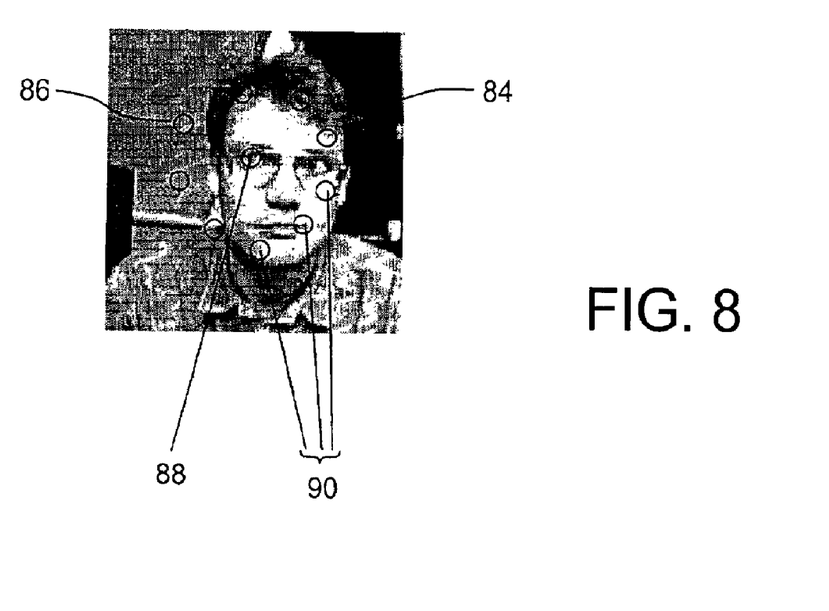
FIG. 8 is an image showing the location of positive and negative activity samples in an image frame for training a neural network for use in the techniques of the invention.
Figure 9:
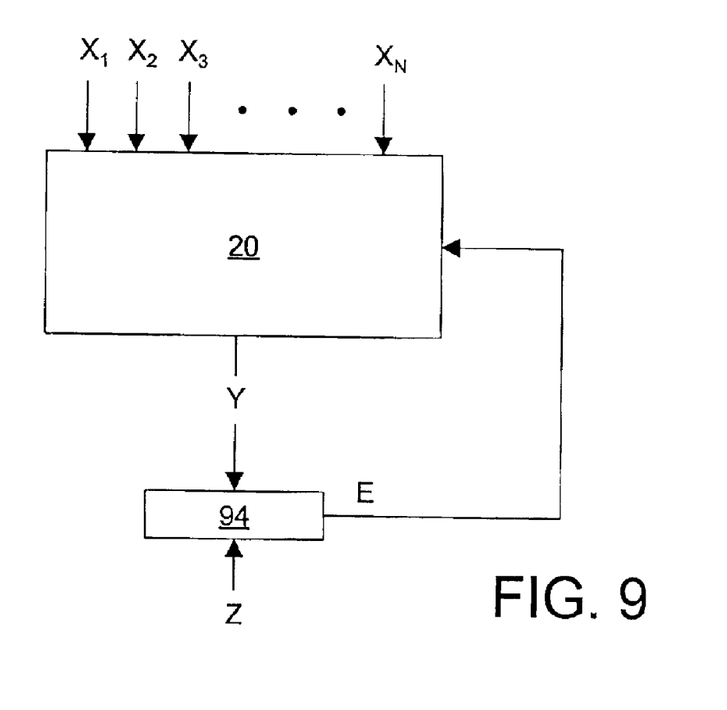
FIG. 9 is a block diagram showing a system for training a neural network for use in the techniques of the invention.

The neural network 20 is trained by adjusting the weighted connections, 80 and 82, to provide a known output Y when presented with particular samples of input values. An exemplary image 84 for obtaining training samples 86 is shown in FIG. 8. The neural network is being trained to classify the left eye in a facial image. Accordingly, a jet 88 corresponding to a pixel centered on the left eye is associated with a high activity value, e.g., 0.9 on a scale from 0 to 1. Other jets 90 may be selected from the facial image that are associated with a low activity value, e.g., 0.1. The low-activity jets may be selected from a regular pattern of positions surrounding the high-activity jet. The wavelet component values $X_N$ of the jets are input at the input nodes of the neural network 20 as shown in FIG. 9, resulting in a current activity value Y. The current activity value is compared with a correct activity value Z by an error computation module 94 resulting in an error value E. The error value is back propagated to update the weighted connections, 80 and 82, of the neural network, as known in the art, to modify the current activity value until it is sufficiently close to the correct activity value. The training process is continued for the high-activity jet 88 and all of the low-activity jets 90 selected from the facial image. Advantageously, for each facial image, the neural network is trained with 50 to 100 low-activity samples for each high-activity sample. Empirical evidence indicates that a neural network may adequately classify a local feature after training based on about 500 sample facial images.

A jet 28 may be selected for analysis by scanning the transformed image with a sensing node 56 of model graph 58 and monitoring the resulting activity value Y or indicator value Z. A maximum value may locate a desired local feature or object image in the image frame.

The techniques of the invention may be advantageous for tracking a node in a series of image frames or reinitializing a tracked node. Node tracking and reinitialization, and model graph scanning, are described in more detail in U.S. Pat. No. 6,272,231, titled WAVELET-BASED FACIAL MOTION CAPTURE FOR AVATAR ANIMATION, which patent is incorporated herein by reference.

Likewise, the techniques of the invention may be practiced more efficiently if only a portion of the image frame 14 undergoes a wavelet transformation as described in more detail in U.S. Pat. No. 6,301,370, titled FACE RECOGNITION FROM VIDEO IMAGES, which patent is incorporated herein by reference.

Although the foregoing discloses the preferred embodiments of the present invention, it is understood that those skilled in the art may make various changes to the preferred embodiments without departing from the scope of the invention. The invention is defined only by the following claims.

We claim:

1. A method for classifying a feature in an image frame, comprising:

transforming an original image frame having an array of pixels using wavelet transformations to generate a transformed image frame having an array of pixels, each pixel of the transformed image being associated with a respective pixel of the original image frame and being represented by a predetermined number of wavelet component values;

selecting a pixel of the transformed image frame associated with the feature;

providing a neural network having an output and a predetermined number of inputs, each input being associated with a respective wavelet component value of the predetermined number of wavelet component values of the selected pixel, wherein the neural network is trained to classify the feature in a transformed image frame; and classifying, using the neural network, the local feature based on the wavelet component values provided at the neural network inputs, and indicating a class of the feature at the neural network output.

2. A method for classifying a feature in an image frame as defined in claim 1, wherein the wavelet transformations use Gabor wavelets.

3. A method for classifying a feature in an image frame as defined in claim 1, wherein each wavelet component value is generated based on a Gabor wavelet having a particular orientation and frequency.

4. A method for classifying a feature in an image frame as defined in claim 1, wherein the feature in the image frame is a facial feature.

5. A method for classifying a feature in an image frame as defined in claim 1, wherein the predetermined number of wavelet component values and the predetermined number of neural network inputs is 12.

6. A method for classifying a feature in an image frame as defined in claim 1, wherein the wavelet component values are magnitudes of complex numbers.

7. A method for analyzing an object image in an image frame, comprising:

transforming an original image frame having an array of pixels using wavelet transformations to generate a transformed image frame having an array of pixels, each pixel of the transformed image being associated with a respective pixel of the original image frame and being represented by a predetermined number of wavelet component values;

selecting pixels of the transformed image frame corresponding to sensing nodes of a label graph, each sensing node for analyzing a local feature of the object image in the original image frame;

providing a plurality of neural networks, each neural network being associated with a sensing node of the label graph and having an output and a predetermined number of inputs, each input being associated with a respective wavelet component value of the predetermined number of wavelet component values of the respective selected pixel, wherein each neural network is trained to analyze the respective local feature of the object image in a transformed image frame;

analyzing, using the neural networks, the local features based on the wavelet component values provided at the neural network inputs, and indicating a characteristic of the object image based on the neural network outputs.

8. A method for classifying a feature in an image frame as defined in claim 7, wherein the wavelet transformations use Gabor wavelets.

9. A method for classifying a feature in an image frame as defined in claim 7, wherein each wavelet component value is generated based on a Gabor wavelet having a particular orientation and frequency.

10. A method for classifying a feature in an image frame as defined in claim 7, wherein the object image is a facial image.

11. A method for classifying a feature in an image frame as defined in claim 7, wherein the predetermined number of wavelet component values is 40 and the predetermined number of neural network inputs is 12.

12. A method for classifying a feature in an image frame as defined in claim 7, wherein the wavelet component values are magnitudes of complex numbers.

13. Apparatus for classifying a feature in an image frame, comprising:

means for transforming an original image frame having an array of pixels using wavelet transformations to generate a transformed image frame having an array of pixels, each pixel of the transformed image being associated with a respective pixel of the original image frame and being represented by a predetermined number of wavelet component values;

means for selecting a pixel of the transformed image frame associated with the feature;

a neural network having an output and a predetermined number of inputs, each input being associated with a respective wavelet component value of the predetermined number of wavelet component values of the selected pixel, wherein the neural network is trained to classify the feature in a transformed image frame and classifies the local feature based on the wavelet component values provided at the neural network inputs, and indicating a class of the feature at the neural network output.

14. Apparatus for classifying a feature in an image frame as defined in claim 13, wherein the wavelet transformations use Gabor wavelets.

15. Apparatus for classifying a feature in an image frame as defined in claim 13, wherein each wavelet component value is generated based on a Gabor wavelet having a particular orientation and frequency.

16. Apparatus for classifying a feature in an image frame as defined in claim 13, wherein the feature in the image frame is a facial feature.

17. Apparatus for classifying a feature in an image frame as defined in claim 13, wherein the predetermined number of wavelet component values and the predetermined number of neural network inputs is 12.

18. Apparatus for classifying a feature in an image frame as defined in claim 13, wherein the wavelet component values are magnitudes of complex numbers.

19. Apparatus for analyzing an object image in an image frame, comprising:

- means for transforming an original image frame having an array of pixels using wavelet transformations to generate a transformed image frame having an array of pixels, each pixel of the transformed image being associated with a respective pixel of the original image frame and being represented by a predetermined number of wavelet component values;
- means for selecting pixels of the transformed image frame corresponding to sensing nodes of a label graph, each sensing node for analyzing a local features of the object image in the original image frame;
- a plurality of neural networks, each neural network being associated with a sensing node of the label graph and having an output and a predetermined number of inputs, each input associated with a respective wavelet component value of the predetermined number of wavelet component values of the respective selected pixel, wherein each neural network is trained to analyze the respective local feature of the object image in a transformed image frame;
- means for analyzing, using the neural networks, the local features based on the wavelet component values provided at the neural network inputs, and indicating a characteristic of the object image based on the neural network outputs.

20. Apparatus for classifying a feature in an image frame as defined in claim 19, wherein the wavelet transformations use Gabor wavelets.

21. Apparatus for classifying a feature in an image frame as defined in claim 19, wherein each wavelet component value is generated based on a Gabor wavelet having a particular orientation and frequency.

22. Apparatus for classifying a feature in an image frame as defined in claim 19, wherein the object image is a facial image.

23. Apparatus for classifying a feature in an image frame as defined in claim 19, wherein the predetermined number of wavelet component values is 40 and the predetermined number of neural network inputs is 40.

24. Apparatus for classifying a feature in an image frame as defined in claim 19, wherein the wavelet component values are complex numbers.

* * * * *